US010240498B2

(12) United States Patent
Doering

(10) Patent No.: US 10,240,498 B2
(45) Date of Patent: Mar. 26, 2019

(54) DEVICE AND METHOD FOR REGENERATING A PARTICULATE FILTER ARRANGED IN THE EXHAUST SECTION OF AN INTERNAL COMBUSTION ENGINE

(71) Applicant: MAN TRUCK & BUS AG, Munich (DE)

(72) Inventor: Andreas Doering, Munich (DE)

(73) Assignee: MAN Truck & Bus AG, Munich (DE)

( * ) Notice: Subject to any disclaimer, the term of this patent is extended or adjusted under 35 U.S.C. 154(b) by 28 days.

(21) Appl. No.: 14/738,173

(22) Filed: Jun. 12, 2015

(65) Prior Publication Data
US 2015/0275722 A1 Oct. 1, 2015

Related U.S. Application Data

(63) Continuation of application No. 13/145,816, filed as application No. PCT/EP2010/000084 on Jan. 11, 2010, now abandoned.

(30) Foreign Application Priority Data

Dec. 14, 2009 (EP) .................................... 09015450

(51) Int. Cl.
*F01N 3/023* (2006.01)
*F01N 3/025* (2006.01)
(Continued)

(52) U.S. Cl.
CPC .............. *F01N 3/023* (2013.01); *F01N 3/025* (2013.01); *F01N 3/027* (2013.01); *F01N 3/0231* (2013.01);
(Continued)

(58) Field of Classification Search
CPC ............................ F01N 3/0231; F01N 13/011
See application file for complete search history.

(56) References Cited

U.S. PATENT DOCUMENTS 4,485,621 A * 12/1984 Wong ..................... B01D 53/86
219/205
4,902,487 A 2/1990 Cooper et al.
(Continued)

FOREIGN PATENT DOCUMENTS

DE 102004019659 A1 12/2004
EP 0341832 A2 11/1989
(Continued)

OTHER PUBLICATIONS

Machine English translation of KR10-2003-0100353.*
"CRT Filter", Dieselnet Technology Guide, XX, Jan. 1, 2001, pp. 1-09, XP001116186.

*Primary Examiner* — Patrick Maines
(74) *Attorney, Agent, or Firm* — Laurence A. Greenberg; Werner H. Stemer; Ralph E. Locher

(57) ABSTRACT

A device and a method for regenerating a particulate filter that is arranged in the exhaust tract of an internal combustion engine. There is disposed at least one NO oxidation catalytic converter upstream of the particulate filter for the oxidation of NO, and in particular to form $NO_2$. At least one heating device is also provided upstream of the particulate filter, by way of which an exhaust-gas flow that is conducted towards the particulate filter can be heated to a defined temperature in accordance with defined regeneration parameters, in particular in accordance with a degree of loading of the particulate filter and/or in accordance with an efficiency of an $NO_2$-based regeneration of the particulate filter by way of an $NO_2$ quantity formed in the at least one NO oxidation catalytic converter.

12 Claims, 4 Drawing Sheets

(51) Int. Cl.
  *F01N 3/027* (2006.01)
  *F01N 9/00* (2006.01)
  *F01N 13/00* (2010.01)
  *F01N 3/08* (2006.01)
  *F01N 11/00* (2006.01)
  *F01N 3/30* (2006.01)

(52) U.S. Cl.
  CPC ........... *F01N 3/0842* (2013.01); *F01N 9/002* (2013.01); *F01N 11/002* (2013.01); *F01N 13/009* (2014.06); *F01N 13/011* (2014.06); *F01N 3/30* (2013.01); *F01N 2240/14* (2013.01); *F01N 2240/16* (2013.01); *F01N 2410/04* (2013.01); *F01N 2560/06* (2013.01); *F01N 2570/14* (2013.01); *F01N 2610/03* (2013.01); *Y02T 10/47* (2013.01)

(56) References Cited

U.S. PATENT DOCUMENTS

| | | | |
|---|---|---|---|
| 5,233,830 A | 8/1993 | Takeshima et al. | |
| 6,276,139 B1* | 8/2001 | Moraal | F01N 3/023 60/605.2 |
| 7,367,182 B2 | 5/2008 | Takahashi et al. | |
| 7,421,839 B2 | 9/2008 | Igarashi | |
| 7,862,640 B2* | 1/2011 | Zhang | B01D 46/2451 422/177 |
| 8,844,271 B2* | 9/2014 | Huber | F01N 3/0253 60/274 |
| 2002/0083700 A1* | 7/2002 | Ellmer | F01N 3/32 60/278 |
| 2008/0092530 A1 | 4/2008 | Toshioka | |
| 2008/0295499 A1* | 12/2008 | Driscoll | F01N 3/0231 60/288 |
| 2009/0031711 A1 | 2/2009 | Braun et al. | |
| 2009/0241519 A1* | 10/2009 | Harndorf | F01N 3/023 60/287 |
| 2011/0072803 A1* | 3/2011 | Van Nieuwstadt | F01N 3/0231 60/287 |
| 2012/0000180 A1* | 1/2012 | Gonze | F01N 3/0231 60/274 |
| 2012/0073270 A1* | 3/2012 | Cox | F01N 3/025 60/287 |
| 2012/0124995 A1* | 5/2012 | Springer | F01N 3/021 60/605.1 |
| 2012/0167555 A1 | 7/2012 | Frazier | |

FOREIGN PATENT DOCUMENTS

| | | | | |
|---|---|---|---|---|
| EP | 1669564 A1 | | 6/2006 | |
| KR | 1020030100353 | * | 7/2005 | ............... F01N 9/00 |

* cited by examiner

DEVICE AND METHOD FOR REGENERATING A PARTICULATE FILTER ARRANGED IN THE EXHAUST SECTION OF AN INTERNAL COMBUSTION ENGINE

CROSS-REFERENCE TO RELATED APPLICATION

This application is a continuation of co-pending application Ser. No. 13/145,816, filed Aug. 22, 2011; which was a § 371 national stage of international application No. PCT/EP2010/000084, filed Jan. 11, 2010, which designated the United States; this application also claims the priority, under 35 U.S.C. § 119, of German patent application No. DE 10 2009 005 733.1, filed Jan. 22, 2009, and European patent application No. EP 09015450, filed Dec. 14, 2009; the prior applications are herewith incorporated by reference in their entirety.

BACKGROUND OF THE INVENTION

Field of the Invention

The invention relates to a device for regenerating a particle filter arranged in the exhaust tract of an internal combustion engine, with an oxidation catalytic converter for the oxidation of NO, to form $NO_2$ in particular, arranged upstream of the particle filter, and to a method for regenerating a particle filter arranged in the exhaust tract of an internal combustion engine.

The invention relates in particular to a method and a device for regenerating particle filters in the case of internal combustion engines operated with an excess of air, such as diesel engines or gasoline engines with direct injection, such as are used for example in motor vehicles or utility vehicles.

To minimize carbon-containing fine matter particles, so-called particle separators or particle filters are conventionally used in vehicles. A typical particle separator arrangement in vehicles is known for example from EP 10 727 65 A2. Such particle separators differ from particle filters in that the exhaust-gas flow is conducted along the separating structures, whereas in the case of particle filters, the exhaust gas must flow through the filter medium. As a result of said difference, particle filters tend to become blocked, which increases exhaust-gas back pressure, that is to say causes an undesired pressure increase at the exhaust-gas outlet of an internal combustion engine, which in turn reduces engine power and results in increased fuel consumption of the internal combustion engine. An example of such a particle filter arrangement is known from EP 03 418 32 A2.

In both of the arrangements described above, in each case, an oxidation catalytic converter arranged upstream of the particle separator or of the particle filter oxidizes the nitrogen monoxide (NO) in the exhaust gas, by means of the residual oxygen ($O_2$) likewise contained therein, to form nitrogen dioxide ($NO_2$), specifically according to the following equation:

$$2NO+O_2 \leftrightarrow 2NO_2 \quad (1)$$

Here, it must be observed that the equilibrium of the above reaction at high temperatures lies on the side of NO. This in turn has the result that the attainable $NO_2$ fractions at high temperatures are limited on account of said thermodynamic limitation.

The $NO_2$ is in turn converted in the particle filter with the hydrocarbon-containing superfine particles to form CO, $CO_2$, $N_2$ and NO. A continuous removal of the accumulated fine matter particles therefore takes place by means of the powerful oxidizing agent $NO_2$, such that regeneration cycles, such as must be carried out in cumbersome fashion in other arrangements, may be dispensed with. In this connection, passive regeneration is referred to, as per the following equations:

$$C+2NO_2 \rightarrow 2NO+CO_2 \quad (2)$$

$$NO_2+C \rightarrow NO+CO \quad (3)$$

Here, the formation of carbon monoxide as per equation 3 plays only a secondary role; in general, a complete oxidation of the carbon up to the oxidation state +4, in the form of carbon dioxide, takes place, wherein for said oxidation, two $NO_2$ molecules are required per carbon molecule.

Aside from $NO_2$, on the platinum-containing NO oxidation catalytic converters, $SO_3$ is also formed from sulfur contained in the fuel and/or engine oil. The $SO_3$ and $NO_2$ condense at cold points in the exhaust tract to form highly corrosive sulfuric and nitric acid, such that the exhaust system leading up to the particle filters must be formed from high-grade steel in order to prevent corrosion.

If complete oxidation of the carbon accumulated in the particle filter is not possible by means of $NO_2$, then the hydrocarbon fraction and therefore the exhaust-gas counter-pressure increase continuously. To prevent this, at present, particle filters are increasingly provided with a catalytic coating for the oxidation of NO (EP 03 418 32 A2). These are specifically platinum-containing catalysts. The disadvantage of said method is however that the $NO_2$ formed on the particle filter can serve only for the oxidation of particles which have been deposited downstream of the catalytically active coating for NO oxidation, that is to say therefore within the filter medium. In contrast, if a layer of deposited particles, a so-called filter cake, forms on the filter surface and therefore on the catalytically active coating, the particle-filter-side NO oxidation catalytic converter thus lies downstream of the filter cake, such that the soot particles deposited there cannot be oxidized by means of $NO_2$ from the NO oxidation catalyst applied to the particle filter. Furthermore, strictly speaking, only the catalyst coating applied on the untreated gas side contributes to the performance of the system, because the $NO_2$ catalytically formed on the clean gas side can no longer come into contact with the soot deposited on the untreated gas side and within the filter material.

A further problem of the coating of the particle filter consists in that the geometric surface areas of the filter are considerably smaller than those of conventionally used catalytic converter substrates. The reason for this is that the filters require relatively large free cross sections and therefore free volume on the untreated gas side in order to store soot and engine oil ashes. If use is made of ceramic filter substrates, this is realized by means of a low cell density of 50 cpsi to 200 cpsi. In contrast, pure catalytic converters are conventionally formed with cell densities of 400 cpsi to 900 cpsi. The increase from 50 cpsi to 900 cpsi yields an increase in the geometric surface area from 1 $m^2/l$ to 4 $m^2/l$, as a result of which considerable increases in conversion on the catalytic converters are possible.

For these reasons, despite the catalytic coating of the filter, it is not possible to dispense with an NO oxidation catalytic converter upstream of the particle filter, resulting in a relatively large structural volume. This is the case even if the NO oxidation catalytic converters and the particle filters form a structural unit in which the inlet region of the particle filter is formed as an NO oxidation catalytic converter, as described for example in DE 103 270 30 A1.

In all of said variants for passive regeneration by means of $NO_2$, it must be observed that, below 200° C. to 230° C., the soot oxidation cannot be further increased by means of an increase in $NO_2$ quantities. The conversion maximum is reached at approximately 370° C. Above said temperature, the soot oxidation takes place according to the above-described reaction (2), that is to say two $NO_2$ molecules react with one carbon molecule. This means, in mass terms, that 0.13 g of carbon can be oxidized with one gram of $NO_2$, that is to say the soot oxidation can be increased arbitrarily by increasing the $NO_2$ quantity. This relationship is illustrated in FIG. 1.

If the temperatures lie below 200° C.-230° C., therefore, reliable functioning of the particle filter cannot be ensured. This usually arises in lightly-loaded engines installed in vehicles, for example in passenger motor vehicles, urban buses or refuse collection vehicles, which additionally spend long periods at idle. Therefore, specifically in such situations, a second option for particle filter regeneration is applied in which the exhaust-gas temperature is actively raised. This takes place for example by means of the metered addition of hydrocarbons (HC) upstream of catalytic converters, in particular HC oxidation catalytic converters. A considerable temperature increase is attained on account of the exothermic nature of the oxidation of the added hydrocarbons by means of the catalytic converters.

   (4)

   (5)

To adequately thermally stabilize said catalytic converters, these usually contain palladium as an active component. Palladium has no NO oxidation activity and furthermore reduces the NO oxidation activity of any platinum contained in the catalytic converters. As a result, HC oxidation catalytic converters have considerably lower NO oxidation activity than pure NO oxidation catalytic converters.

If a temperature increase to over 600° C. is possible as a result of the dosing of hydrocarbons, the carbon deposited in the particle filter is oxidized or burned off by means of oxygen, as per the following equations:

   (6)

   (7)

However, with said so-called active filter regeneration, there is the risk that the exothermic burn-off of the carbon-containing soot can lead to an intense temperature increase to over 1000° C. and therefore to damage to the particle filter and/or to downstream catalytic converters. Furthermore, since the temperature increase must be maintained for several minutes in order to ensure a quantitative oxidation of the soot particles, the demand for hydrocarbons is not inconsiderable, and impairs the efficiency of the internal combustion engine, because the fuel is conventionally used as the hydrocarbon source.

A further problem in contrast to passive regeneration is the high carbon monoxide emissions during the regeneration, the formation of which carbon monoxide is described in equation 7. For this reason, a further catalytic converter for the oxidation of the carbon monoxide formed during the regeneration must be attached to the particle filter and/or downstream of the particle filter in order to prevent the discharge of said carbon monoxide to the environment.

A simple combination of passive and active regeneration by the metered addition of hydrocarbons upstream of NO oxidation catalytic converters is not expedient:

As a result of the temperature increase to over 600° C., virtually no more $NO_2$ is formed on the NO oxidation catalytic converters on account of the thermodynamic limitation. Furthermore, the oxidation of NO is hindered on account of the large quantities of hydrocarbons, resulting in a severe reduction in $NO_2$ formation. As a result, the particles must be oxidized by means of oxygen alone, because no $NO_2$ is available in said phase, which lengthens the regeneration time and leads to high carbon monoxide emissions.

At the same time, NO oxidation catalytic converters are significantly less stable with regard to thermal damage than catalytic converters for hydrocarbon oxidation, because irreversible sintering of the active components, and therefore a decrease in NO oxidation activity, occurs at temperatures of over 550° C.

SUMMARY OF THE INVENTION

It is therefore an object of the present invention to provide a device and a method for regenerating a particle filter arranged in the exhaust tract of an internal combustion engine, by means of which device and method functionally reliable and safe particle filter regeneration can be attained in a structurally simple and compact manner.

Said object is achieved, with regard to the device, by means of the features of the main device claim. With regard to the method, said object is achieved by means of the features of the main method claim. Advantageous refinements of these are specified in each case in the dependent claims.

According to the invention, upstream of the particle filter, in addition to the at least one NO oxidation catalytic converter there is also provided at least one heating device by means of which an exhaust-gas flow conducted to the particle filter can be heated as a function of defined regeneration parameters, in particular can be heated to a defined temperature as a function of a degree of loading of the particle filter and/or a regeneration efficiency or regeneration work of an $NO_2$ regeneration of the particle filter by means of an $NO_2$ quantity formed on the at least one NO oxidation catalytic converter. By means of the heated exhaust-gas flow, therefore, the temperature at the particle filter can be increased, wherein at the same time high quantities of $NO_2$ are still available from the NO oxidation catalytic converter because, in the region of the NO oxidation catalytic converter, no temperature increase takes place which has an adverse effect on $NO_2$ formation, and no increased hydrocarbon concentrations are present which lead to a decrease in NO oxidation activity. Said temperature increase of the exhaust-gas flow upstream of the particle filter therefore takes place in a part of the exhaust tract which lies downstream of the NO oxidation catalytic converter and/or parallel to the NO oxidation catalytic converter and upstream of the particle filter. According to the invention, therefore, a functionally reliable combination of active and passive regeneration of a particle filter is provided which utilizes the respective advantages and avoids negative interactions.

With such a solution according to the invention, it is therefore possible for the particle filter regeneration to be realized exclusively by means of the $NO_2$ quantity, wherein if required, the temperature at the particle filter is shifted into the optimum temperature window for the respectively desired reaction by means of an electronic monitoring unit designed as a control and/or regulating device. That is to say, by means of the at least one heating device, the exhaust-gas flow conducted to the particle filter is merely heated, at predefined times and/or in predefined operating states of the internal combustion engine and/or of the aftertreatment system, to a temperature which lies below the regeneration temperature of a pure active particle filter regeneration by means of the metered addition of hydrocarbons to the exhaust-gas flow. Here, said exhaust-gas flow conducted to the particle filter is preferably heated to a temperature of less than 600° C., preferably of less than or equal to approximately 550° C., most preferably of less than or equal to approximately 450° C. Here, the temperatures particularly preferably lie in a temperature window from 300° C. to 550° C., most preferably in a temperature window from 350° C. to 450° C. In the solution according to the invention, therefore, the temperature of the exhaust-gas flow conducted to the particle filter is particularly preferably predefined, as a function of an $NO_2$ concentration and/or of the loading state of the particle filter with carbon-containing particles, in a defined region of at least one exhaust-gas flow, specifically with the aid of a control and/or regulating device as an electronic monitoring device.

On account of the relatively high temperatures that are possible according to the invention with simultaneous assistance of the soot oxidation by the powerful oxidizing agent $NO_2$, it is possible for the regeneration duration to be shortened and for the regeneration temperature to be lowered to approximately 400° C. In this way, the hydrocarbon quantity required for the temperature increase and the carbon monoxide emissions occurring as a result of the regeneration are likewise reduced, as is the risk of an uncontrollable temperature increase and associated thermal damage to the particle filter or downstream catalytic converters.

To ensure reliable regeneration of the particle filter or particle separator, it is provided according to one particularly preferred embodiment that, at least during a defined regeneration mode, the mass ratio between carbon and nitrogen dioxide contained in the exhaust gas is at least 1:4, preferably at least 1:8. Said regeneration mode is characterized in particular by a defined increase in the exhaust-gas temperature upstream of the particle filter.

Here, in a first physical embodiment, the heating device is preferably arranged in parallel, in terms of flow, with the NO oxidation catalytic converter. For example, the heating device and NO oxidation catalytic converter are hereby decoupled in terms of flow such that the heating device and the NO oxidation catalytic converter are traversed by in each case one exhaust gas or gas flow. In physical terms, this means that for example a first exhaust-gas flow flows through the NO oxidation catalytic converter and a second exhaust-gas flow flows through or over the heating device, the two exhaust-gas flows being merged downstream of the NO oxidation catalytic converter and the heating device and upstream of the particle filter. In a first device variant, it is possible for this purpose for a branch line from a supply line leading to the NO oxidation catalytic converter to be branched off upstream of the NO oxidation catalytic converter, the branch line then opening into a discharge line, which leads from the NO oxidation catalytic converter to the particle filter, downstream of the NO oxidation catalytic converter. The heating device should then be arranged in the region of the branch line. Alternatively, however, a structural design is also possible in which the NO oxidation catalytic converter encloses or surrounds the heating device at least in regions. In this way, in particular, cooling of the heating device is advantageously prevented.

For the flow branching of an exhaust-gas flow, in a further particularly preferred refinement of the solution according to the invention, a shut-off device, for example a flap or the like, is provided which is coupled by means of a control and/or regulating device and by means of which the quantity of the gas flow conducted via the NO oxidation catalytic converter and/or of the gas flow conducted via the heating device can be controlled or regulated as a function of defined operating or shut-off parameters.

As an alternative to the parallel arrangement, in terms of flow, of at least one NO oxidation catalytic converter and at least one heating device, it may also be provided that these are arranged in series with one another in terms of flow and are traversed by one exhaust-gas flow. For this purpose, the heating device should then be arranged downstream of the NO oxidation catalytic converter and upstream of the particle filter.

The heating device itself is preferably formed by a heating catalytic converter which in turn is preferably designed as an oxidation catalytic converter. It is also particularly preferable for a dosing device to be provided by means of which a reducing agent for an exothermic reaction is dosed to the exhaust-gas flow upstream of the heating catalytic converter at predefined times and in predefined quantities as a function of defined dosing parameters. Here, the dosing takes place in particular periodically. For the particularly preferred situation that the heating catalytic converter is an HC oxidation catalytic converter, the reducing agent preferably takes the form of hydrocarbons.

Here, the hydrocarbons preferably take the form of fuel. It is particularly preferable for the added hydrocarbons to be dosed by means of a separate dosing device, for example an injection nozzle or the like, which is provided in the exhaust tract. Said dosing then takes place upstream of the heating catalytic converter by virtue of a predefined quantity of hydrocarbons being dosed or injected into the exhaust-gas flow at predefined times. Particularly preferable here, as already mentioned above, is a dosing which takes place, by means of an electronic control unit, corresponding to predefined control and/or regulating parameters, and which is for example periodically repeated.

For the oxidation of the dosed hydrocarbons, therefore, the exhaust-gas flow to be heated can be conducted over the heating device, which is designed preferably as an HC oxidation catalytic converter, as a result of which the exhaust-gas flow is heated. The heating power to be obtained in this way is however limited by the available oxygen quantity. This is because, if the lambda value, that is to say the ratio of oxygen quantity to fuel quantity, reaches the value 1, oxidation of the hydrocarbons is no longer possible. To avoid this, in a further preferred refinement, it is proposed that fresh air be supplied to the exhaust-gas flow to be heated after a certain predefined temperature and/or a predefined time is reached and/or when a predefined lambda or oxygen value is undershot. Said optional fresh-air supply causes an increase in the lambda value and therefore also an increase in the maximum possible heating power. Here, the fresh air may generally be branched off on the charge-air side of the internal combustion engine, specifically for example also upstream and/or downstream of an opening of an exhaust-gas recirculation line into a charge-air line of the internal combustion engine. The use of a blower or compressor for the delivery of fresh air is also conceivable.

An alternative possibility for increasing the exhaust-gas temperature consists in using a burner, which is operated preferably with fuel, as a heating device. The above-described problems with regard to excessively low air ratios apply to a particularly great extent to said burner, which problems can be worked around analogously to the solution for the heating catalytic converter.

The heating device, in particular the heating catalytic converter, may basically be arranged outside the exhaust tract, that is to say such that the exhaust gas does not flow around said heating catalytic converter. This however leads to relatively rapid cooling of said heating device, in particular of the heating catalytic converter. It is therefore more expedient for the heating device, in particular the heating catalytic converter, to be arranged in the exhaust tract such that the exhaust gas flows at least partially around said heating catalytic converter, as a result of which the heat losses to the environment are reduced.

In particular, it is possible for the HC oxidation catalytic converter, for example, as a heating catalytic converter to be surrounded by the NO oxidation catalytic converter. It is also possible for a common substrate to be used for the NO oxidation catalytic converter and for the HC oxidation catalytic converter, for example, to be used as a heating catalytic converter, which common substrate has different catalytic coatings in different regions. By means of flow-manipulating fixtures, such as guide plates and/or partitions, upstream of the substrate, it is ensured that no hydrocarbons impinge on the regions with NO oxidation coating during the regeneration phase.

It is also conceivable for the heating device, in particular the heating catalytic converter, and the NO oxidation catalytic converter to be accommodated in a common housing.

To further improve the system, it is also possible for the heating catalytic converter, designed preferably as an HC oxidation catalytic converter, to additionally be provided with NO oxidation activity, as a result of which the $NO_2$ fractions are increased in non-regeneration operation and thereby the oxidation of the particles by means of the passive regeneration is improved. In this way, it is possible for the intervals between the active increases in temperature to be lengthened. Here, the heating catalytic converter should be designed to be thermally more stable than the pure NO oxidation catalytic converter. Said heating catalytic converter conventionally has lower NO oxidation activity than pure NO oxidation catalytic converters, as has already been mentioned above.

To avoid high hydrocarbon concentrations downstream of the particle filter in particular when HC oxidation catalytic converters are used as heating catalytic converters, this may be provided with a catalyst for the oxidation of hydrocarbons. It is also conceivable for a catalyst with hydrocarbon oxidation activity to be applied or arranged upstream and/or downstream of the particle filter. As active components, consideration is given inter alia to vanadium oxide, cerium, zeolites and elements of the platinum metal group.

In contrast, as active components both for the NO oxidation catalytic converters and also for the HC oxidation catalytic converters, consideration is given primarily to metals of the platinum metal group, but the composition thereof differs: to improve the thermal stability of the HC oxidation catalytic converters, the palladium fraction thereof, for example, is higher than that of the NO oxidation catalytic converters. For the HC oxidation catalytic converters, cerium is basically also taken into consideration as an active element.

The activity of the two catalytic converter types may be additionally increased for example through the use of zeolites.

The regeneration may also optionally be improved by increasing the $NO_2$ availability. This may be achieved by increasing the $NO_x$ untreated emissions. This may be done by varying engine operating parameters such as injection pressure, exhaust-gas recirculation rates, start of injection, number of injections, intake throttle position etc. As a result of the higher $NO_x$ availability, the $NO_2$ quantity formed on the NO oxidation catalytic converters is simultaneously increased. A further option is for the $NO_2$ quantity formed to be increased by improving the NO oxidation on the NO oxidation catalytic converters. This is conventionally possible by increasing the residence time, in particular by reducing the exhaust-gas quantity conducted over the catalytic converters, and/or by increasing the temperature of the NO oxidation catalytic converters. To achieve this, it is possible inter alia to use the measures already described above for increasing the NOx untreated emissions.

To reduce not only the particles but also the emissions of nitrogen oxides, it is possible for catalytic converters for $NO_X$ reduction, such as for example at least one $NO_X$ storage catalytic converter and/or at least one SCR catalytic converter, to additionally be provided in the exhaust tract or exhaust section. The NOx storage catalytic converters may be arranged downstream of the oxidation catalytic converters and/or downstream of the particle filter, whereas the SCR catalytic converters may also conceivably be positioned upstream of the oxidation catalytic converters. For the $NO_X$ storage catalytic converters, platinum and/or barium and/or calcium are preferably used as active components. In contrast, for the SCR catalytic converters, the use of tungsten-oxide-stabilized vanadium pentoxide, preferably based on titanium dioxide, or iron zeolites or copper zeolites or cobalt zeolites or zirconium oxide is expedient.

The installation space of such a system for the reduction of nitrogen oxides and particles can be reduced by virtue of the at least one particle filter and the at least one SCR catalytic converter and/or the at least one $NO_x$ trap catalytic converter forming a structural unit, wherein the particle filter may be provided with an SCR catalyst and/or $NO_X$ storage catalyst coating.

In summary, it can therefore be stated that, by means of the solution according to the invention, in which active and passive particle filter regeneration are combined at least at times, a range of advantages can be attained: The regeneration capability of the system can thus be actively influenced. Furthermore, the adjustment can be carried out such that the greatest amount of regeneration work takes place by means of the oxidation of soot by means of $NO_2$ which is formed on an upstream NO oxidation catalytic converter, that is to say the reducing agent or fuel is added in metered fashion only if the regeneration work by means of $NO_2$ is not sufficient, such that fuel consumption is considerably minimized in relation to pure active particle filter regeneration. Furthermore, the solution according to the invention is associated with considerably lower thermal loading of the particle filter, in particular of the diesel particle filter, and of any downstream exhaust-gas aftertreatment components. A further significant advantage is that the regeneration can take place very uniformly, as a result of which the risk of so-called soot clusters and burn-through of the particle filter is reduced. A further significant advantage can be considered to be that the platinum requirement and therefore the costs for producing the exhaust-gas aftertreatment system are considerably lower than those of pure HCl regeneration systems (HydroCarbon Injection), that is to say of pure active regeneration systems, since smaller quantities of hydrocarbons must be oxidized, and an oxidation of carbon monoxide formed during the active regeneration is not required. Furthermore, on account of the small driving temperature difference, the heat losses to the environment are lower than in the case of the pure active particle filter regeneration, as a result of which less expenditure is required for insulation and material etc.

A plurality of exemplary embodiments of the present invention will be explained below on the basis of a drawing.

DETAILED DESCRIPTION OF THE INVENTION

Figure 3:
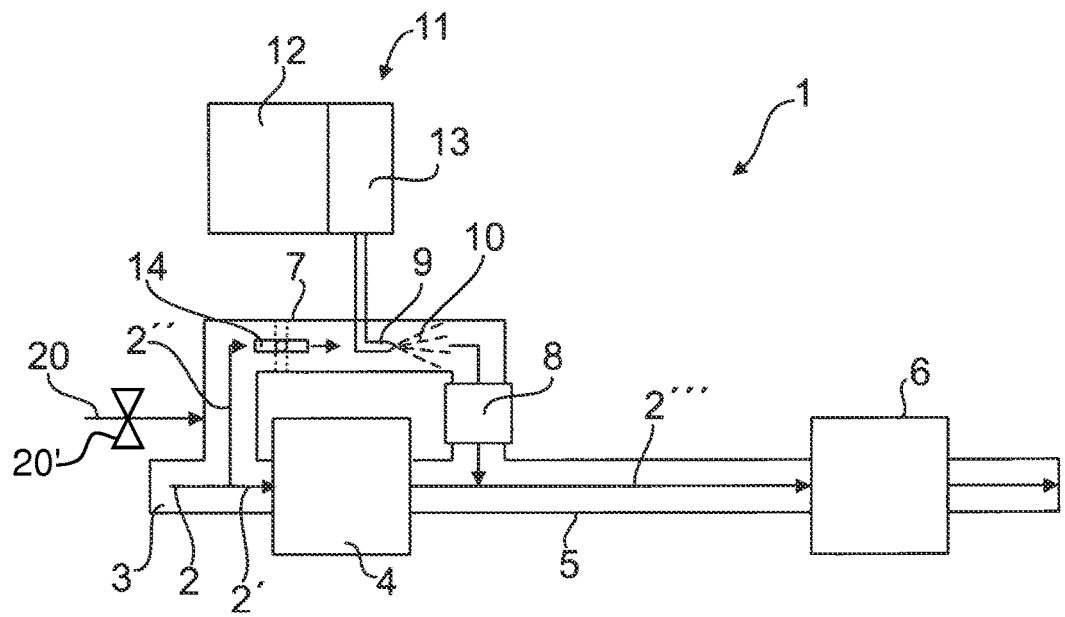
FIG. 3 shows a first embodiment of a parallel arrangement of an NO oxidation catalytic converter and of a heating catalytic converter, designed as an HC oxidation catalytic converter, upstream of a particle filter.

FIG. 3 shows a first exemplary embodiment according to the invention, in which, in the exhaust tract 1 of an internal combustion engine not illustrated here, in particular of a diesel internal combustion engine, an exhaust-gas flow 2 is conducted by means of a supply line 3 to an NO oxidation catalytic converter 4. A discharge line 5 leads from said NO oxidation catalytic converter 4 to a particle filter 6.

Upstream of the NO oxidation catalytic converter 4, a branch line 7 branches off from the supply line 3 and opens into the discharge line 5 downstream of the NO oxidation catalytic converter 4.

An HC oxidation catalytic converter 8 as a heating device is arranged in said branch line 7. Furthermore, a nozzle 9 is arranged in the branch line 7 upstream of the HC oxidation catalytic converter 8, by means of which nozzle 9 fuel 10 as reducing agent can be injected into the branch line 7 upstream of the HC oxidation catalytic converter 8.

For this reason, the nozzle 9 is a constituent part of a dosing device 11 which, aside from the nozzle 9, also has a fuel tank 12 and a control and/or regulating device 13 which controls and/or regulates the dosing.

A shut-off element 14 is optionally arranged in the branch line 7 upstream of the nozzle 9, which shut-off element 14 may likewise be coupled to an electronic monitoring unit, which is however not illustrated here, in order to branch off a defined exhaust-gas quantity from the exhaust-gas flow 2 at predefined times, such that a first exhaust-gas flow 2' flows through the NO oxidation catalytic converter 4 and a second exhaust-gas flow 2" flows through the branch line 7.

Said two exhaust-gas flows are then merged again downstream of the NO oxidation catalytic converter 4 and downstream of the HC oxidation catalytic converter 8, and supplied as exhaust-gas flow 2'" to the particle filter 6.

Figure 1:
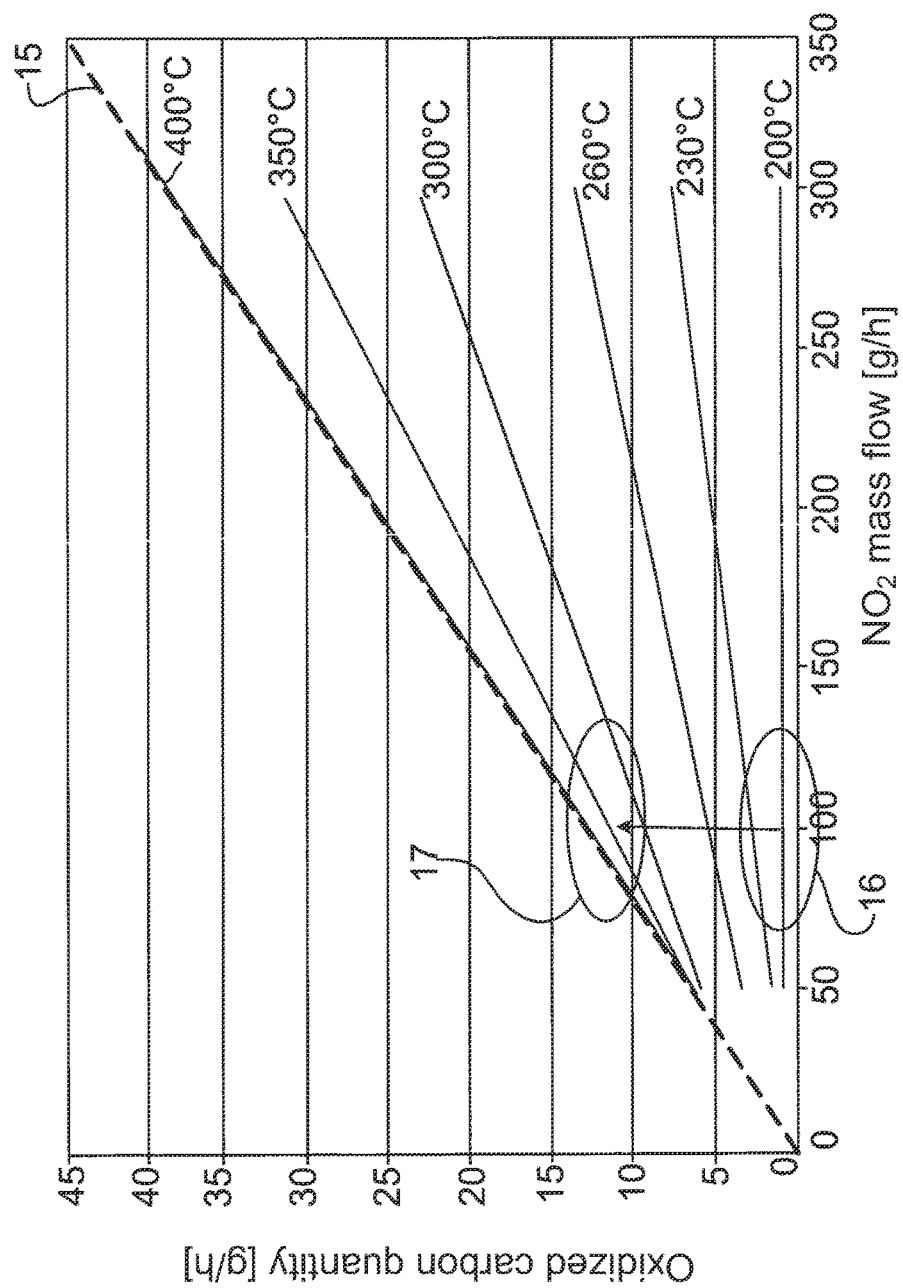
FIG. 1 schematically shows a diagram which shows by way of example the improvement in soot oxidation as a result of the increase in temperature.

As is illustrated merely schematically in FIG. 3, the NO oxidation catalytic converter 4 is designed and dimensioned to be significantly larger than the HC oxidation catalytic converter 8, the reason for this being that the particle filter regeneration should be carried out substantially as $NO_2$-based particle filter regeneration, that is to say by means of the $NO_2$ formed in the NO oxidation catalytic converter 4. Only in the event that the regeneration work of the $NO_2$ formed in or on the NO oxidation catalytic converter 4 is not sufficient is fuel 10 dosed into the branch line 7 via the nozzle 9 in a manner correspondingly controlled or regulated by means of the control and/or regulating device 13. At the same time, by means of corresponding activation of the shut-off element 14, a corresponding exhaust-gas mass flow as a second exhaust-gas flow 2" is conducted via the branch line 7 in order to supply an exhaust-gas flow enriched with hydrocarbons to the HC oxidation catalytic converter 8, as a result of which an exothermic reaction takes place in the HC oxidation catalytic converter, which exothermic reaction generates a hot second exhaust-gas flow 2" which is mixed with the first exhaust-gas flow 2' downstream of the NO oxidation catalytic converter 4, such that said first exhaust-gas flow 2', which as before is enriched with $NO_2$, is raised to a higher temperature level, as a result of which the $NO_2$-based soot oxidation in the particle filter 6 takes place in an optimized manner, as schematically illustrated in FIG. 1. In said figure, 15 denotes the ideal line which represents 100% conversion; specifically, here, 0.13 g of carbon is oxidized per gram of $NO_2$ supplied. If it is now detected by the electronic monitoring unit that the $NO_2$ regeneration work in the lower temperature range 16 no longer provides satisfactory regeneration results and/or the degree of loading of the particle filter has risen above a predefined limit, then by means of the measures specified above, the temperature level is raised to the upper temperature range 17 in order to make more effective, and optimize, the soot burn-off. Here, on account of the combination according to the invention of possible active and passive regeneration, it is for example sufficient for the exhaust-gas flow conducted to the particle filter 6 to be raised to a temperature level which lies preferably in the range from 370° C. to 400° C. As a result of the additional increase in the $NO_2$ level shown in FIG. 2 by means of the increase, already described above, of the $NO_x$ untreated emissions and/or the improvement in the NO oxidation activity of the NO oxidation catalytic converter by means of changed operating parameters of the internal combustion engine and/or of the NO oxidation catalytic converters, the regeneration capability can be additionally improved in relation to the pure increase in exhaust-gas temperature.

The determination of the $NO_2$ quantity and/or of the regeneration capability and/or of the degree of loading of the particle filter may be carried out for example by means of mathematical models and/or characteristic maps and/or by means of exhaust-gas sensors, in particular pressure sensors, $NO_2$ sensors, $NO_x$ sensors, temperature sensors and/or sensors for determining the particle or soot quantity.

Figure 4:
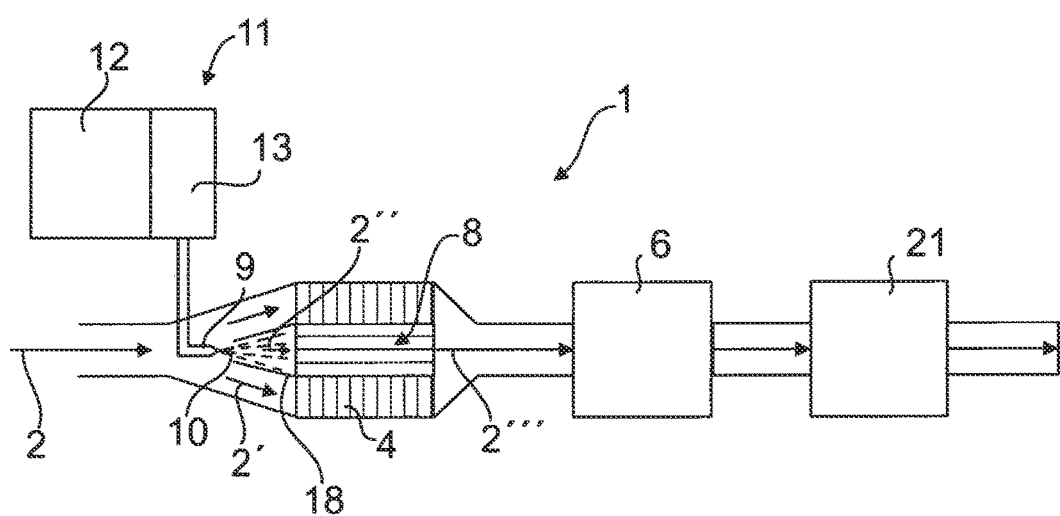
FIG. 4 schematically shows an alternative embodiment of a parallel arrangement of an NO oxidation catalytic converter and of a heating catalytic converter, designed as an HC oxidation catalytic converter, upstream of a particle filter.

That which has been stated above applies analogously to the alternative refinement according to FIG. 4, in which, in contrast to the refinement according to FIG. 3, the NO oxidation catalytic converter 4 and HC oxidation catalytic converter 8 have been connected in parallel in such a way that the HC oxidation catalytic converter 8, which forms the heating catalytic converter or the heating device, is surrounded here at least in regions by the NO oxidation catalytic converter. In this way, the cooling of the HC oxidation catalytic converter 8 is more effectively prevented than is the case with a separate arrangement of an HC oxidation catalytic converter 8. Here, similarly to the embodiment according to FIG. 3, the fuel 10 is dosed only to the HC oxidation catalytic converter 8. For the division of the exhaust-gas flows through the NO oxidation catalytic converter 4 on the one hand and through the HC oxidation catalytic converter 8 on the other hand, it is possible here, too, for flow guiding elements to be provided, for example a guide element 18 illustrated merely schematically in FIG. 3. Furthermore, a shut-off element may also be provided in the region of said guide element 18, which shut-off element controls and/or regulates the quantity or generally the inflow of an exhaust-gas flow to the HC oxidation catalytic converter 8, as has already been described above in conjunction with the shut-off element 14 and the branch line 7.

Through the use of a guide element, it is also made possible for the NO oxidation catalytic converter 4 and the HC oxidation catalytic converter 8 to be applied to a common catalytic converter substrate. Here, those regions which, during the regeneration, are impinged on by hydrocarbons from the supply unit, designed in this case for example as a nozzle 9, are formed, in particular coated, as an HC oxidation catalytic converter 8, whereas the remaining regions are formed, in particular coated, as NO oxidation catalytic converters 4. The different regions usually vary over the cross section, that is to say perpendicular to the flow direction.

FIG. 4 also shows merely schematically a $NO_X$ reduction catalytic converter 21 which is likewise arranged in the exhaust tract 1 and which is designed for example as a $NO_X$ storage catalytic converter or SCR catalytic converter.

Figure 2:
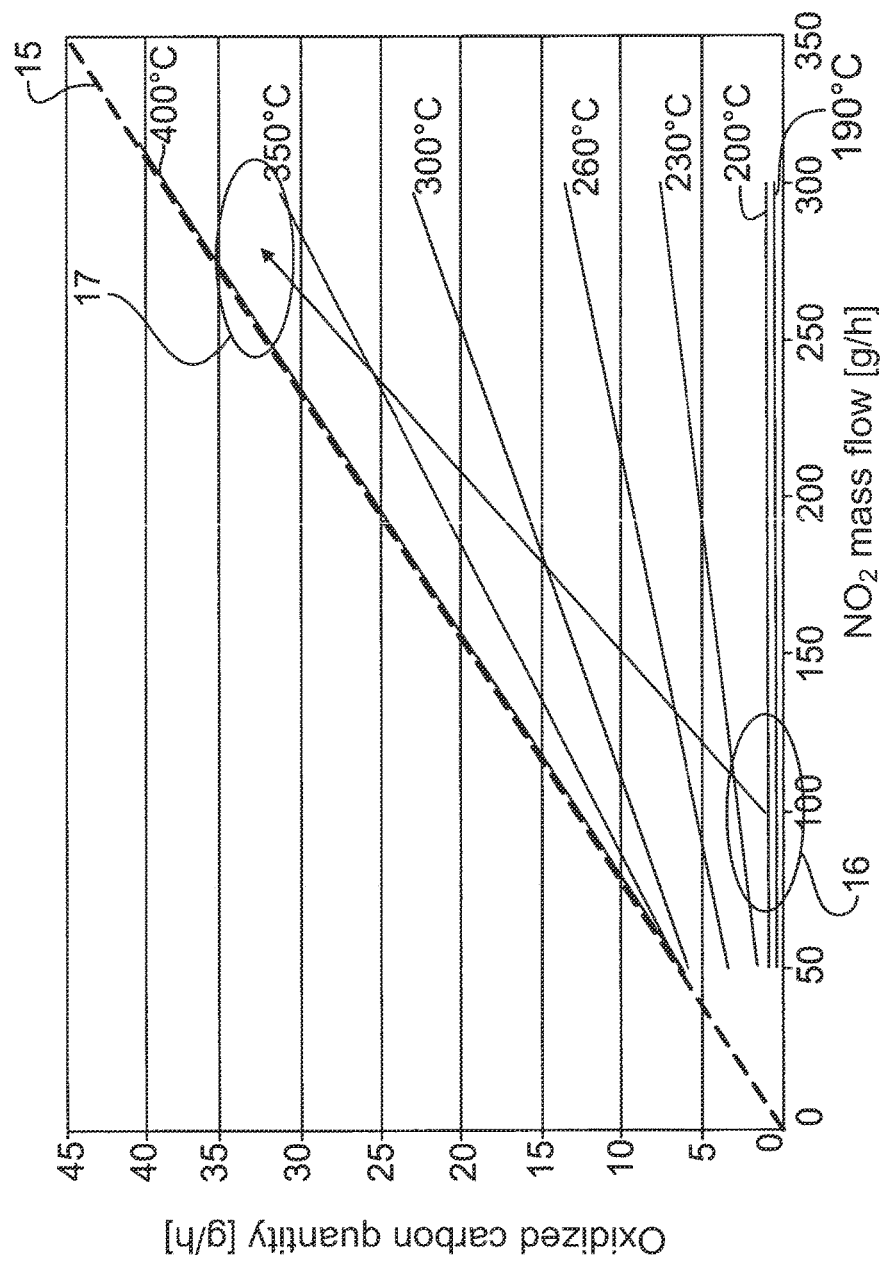
FIG. 2 schematically shows a diagram illustrating the improvement in soot oxidation as a result of an increase in $NO_2$ availability and temperature.

The mode of operation and method implementation otherwise correspond to those already described in conjunction with FIGS. 1 to 3.

Figure 5:
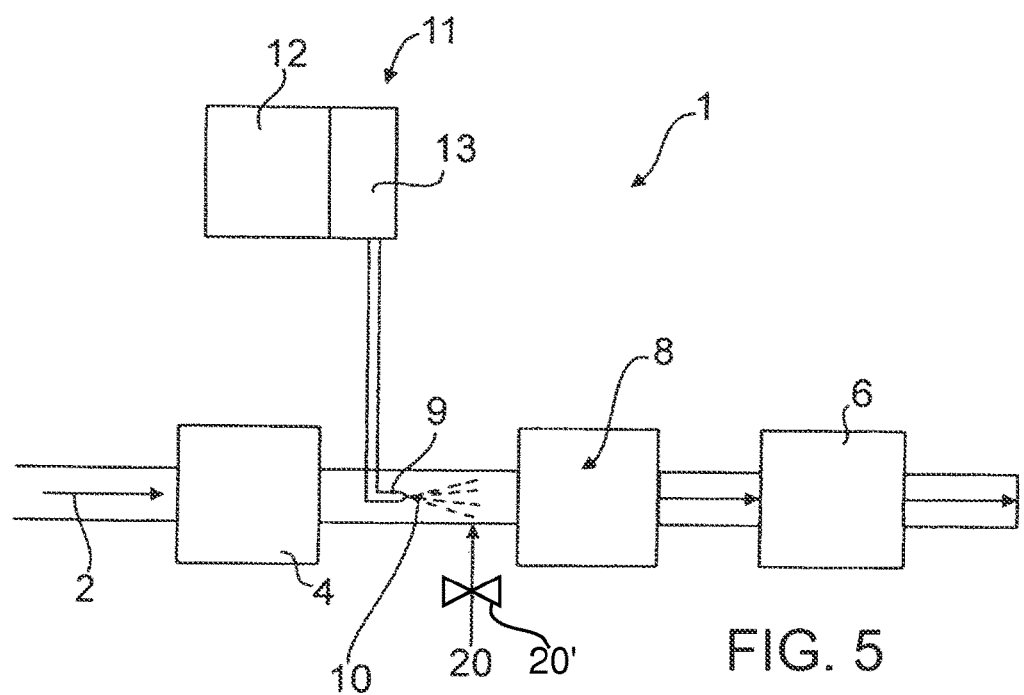
FIG. 5 schematically shows a further alternative refinement of a device according to the invention for regenerating a particle filter arranged in the exhaust tract of an internal combustion engine, with a serial arrangement of an NO oxidation catalytic converter and an HC oxidation catalytic converter upstream of a particle filter.

Finally, FIG. 5 shows an embodiment in which the NO oxidation catalytic converter 4 and the HC oxidation catalytic converter 8 are not connected in parallel but rather are arranged in series. In physical terms, this means that the HC oxidation catalytic converter 8 is arranged downstream of the NO oxidation catalytic converter 4 and also upstream of the particle filter 6. The dosing of the fuel 10 as reducing agent then takes place here likewise such that said fuel cannot pass into the NO oxidation catalytic converter 4, by virtue of the dosing taking place downstream of the NO oxidation catalytic converter 4 and upstream of the HC oxidation catalytic converter 8. The method implementation and the mode of operation otherwise correspond to those already explained in more detail above in conjunction with FIGS. 1 to 4. The significant difference here therefore consists in that, in contrast to the refinements of FIGS. 3 and 4, the exhaust-gas flow 2 is not branched or divided, but rather the entire exhaust-gas flow 2 flows firstly through the NO oxidation catalytic converter 4, subsequently through the HC oxidation catalytic converter 8 and subsequently further through the particle filter 6.

Figure 6:
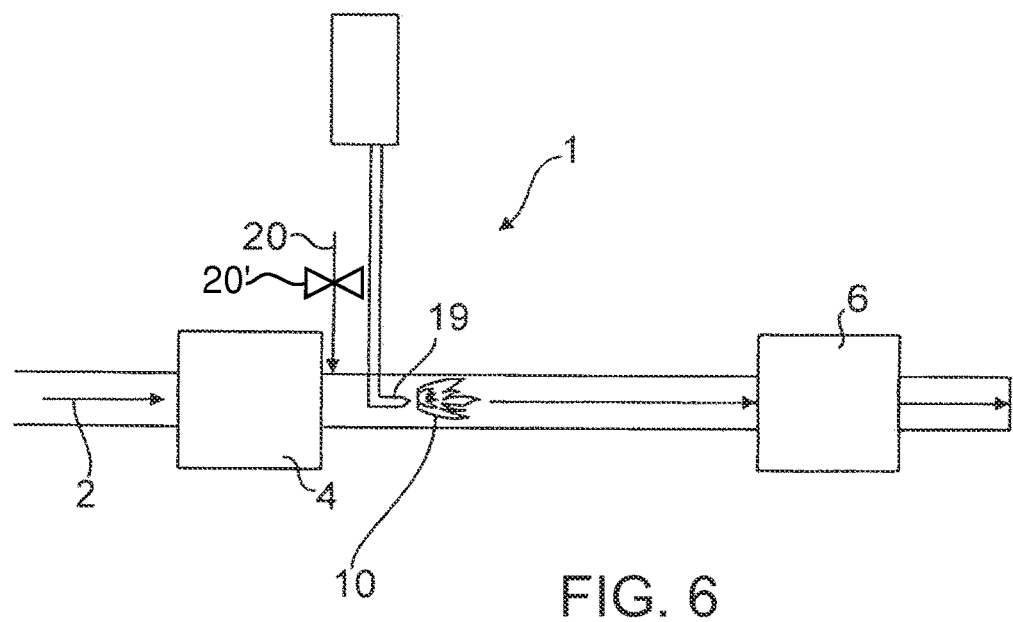
FIG. 6 schematically shows an alternative embodiment to FIG. 5, in which a burner is used instead of a heating catalytic converter.

FIG. 6 finally shows an alternative embodiment to that shown in FIG. 5, in which, instead of an HC oxidation catalytic converter 8 as a heating device, use is made of a burner 19 operated with fuel. The use of such a burner is always possible in particular also in connection with the embodiments mentioned above, in particular in connection with the embodiment according to FIG. 3. The design of FIG. 6 otherwise corresponds to that of FIG. 5, such that in order to avoid repetitions, reference is made to the statements made above.

In all the embodiments, therefore, the exhaust-gas flow or a partial exhaust-gas flow is conducted over a heating device. The heating power to be attained in this way is however limited, as already described above, by the available oxygen quantity. To avoid this, it is optionally possible for fresh air, for example a fresh-air flow branched off at the charge-air side, to be supplied to the exhaust-gas flow to be heated after a predefined temperature and/or a predefined time is reached and/or when a predefined lambda or oxygen value is undershot. The fresh air supply 20 and a shut-off valve 20' are illustrated merely highly schematically in FIGS. 3, 5 and 6.

The invention claimed is:

1. A method for regenerating a particle filter arranged in an exhaust tract, which method comprises:
    conducting an exhaust-gas flow through at least one NO oxidation catalytic converter for the oxidation of NO upstream of the particle filter;
    conducting an exhaust-gas flow through at least one heating device and to the particle filter, and heating the exhaust-gas flow to a defined temperature in dependence on defined regeneration parameters;
    providing the heating device in parallel, in terms of flow, with the NO oxidation catalytic converter, splitting the exhaust gas flow into a first exhaust-gas flow and a second exhaust gas flow and conducting the first exhaust-gas flow through the NO oxidation catalytic converter and the second exhaust-gas flow through or over the heating device, and merging the first and second exhaust-gas flows downstream of the NO oxidation catalytic converter and the heating device and upstream of the particle filter;
    at least during a regeneration phase causing a defined increase in an exhaust-gas temperature upstream of the particle filter and setting a mass ratio between carbon and nitrogen dioxide contained in the exhaust gas to at least 1:4; and
    supplying a predefined quantity of a charge-air-side fresh-air flow and/or a predefined quantity of a charge-air flow branched off downstream of the opening point of an exhaust-gas recirculation line into a charge-air line to the exhaust-gas flow upstream of the heating device when a predefined lambda value is undershot and/or when a predefined oxygen value is undershot.

2. The method according to claim 1, which comprises heating the exhaust gas for active and passive particle filter regeneration which are combined at least at times.

3. The method according to claim 1, wherein one of the regeneration parameters is an efficiency of an NO2-based regeneration of the particle filter by means of an $NO_2$ quantity formed on the at least one NO oxidation catalytic converter.

4. The method according to claim 1, wherein the mass ratio of carbon to nitrogen dioxide is 1:8, at least during the regeneration phase.

5. The method according to claim 1, which comprises heating the exhaust-gas flow conducted to the particle filter with the at least one heating device to a temperature below a regeneration temperature of a pure active particle filter regeneration by way of metering hydrocarbons into the exhaust-gas flow.

6. The method according to claim 5, which comprises heating the exhaust-gas flow to a temperature below 600° C.

7. The method according to claim 6, which comprises heating the exhaust-gas flow to a temperature of less or equal to approximately 550° C., with a temperature window extending from approximately 300° C. to no more than 550° C.

8. The method according to claim 6, which comprises heating the exhaust-gas flow to a temperature of less or equal to approximately 450° C., with a temperature window extending from approximately 350° C. to no more than 450° C.

9. The method according to claim 1, which comprises providing an open-loop or closed-loop control device for predefining the temperature of the exhaust-gas flow conducted to the particle filter in a defined region of at least one exhaust-gas flow as a function of an NO2 concentration and/or the loading of the particle filter and/or the regeneration capability of the particle filter.

10. The method according to claim 1, which comprises, during a regeneration of the particle filter, varying at least one of an NOx untreated emissions of the internal combustion engine or an oxidation capability of the NO oxidation catalytic converter by adjusting defined operating parameters.

11. The method according to claim 10, wherein the varying step comprises increasing at least one operating parameter selected from the group consisting of a fuel injection pressure, a start of injection, an exhaust-gas recirculation rate, and a number of injections.

12. The method according to claim 1, wherein one of the defined regeneration parameters is a degree of loading of the particle filter.

\* \* \* \* \*